(12) United States Patent
Hand (10) Patent No.: US 9,033,021 B2
(45) Date of Patent: May 19, 2015

(54) ADAPTIVE PORTABLE HUNTING BLIND SYSTEM AND METHOD

(75) Inventor: Scott P. Hand, Lawson, MO (US)

(73) Assignee: Real Action Hunting Products, LLC, Lawson, MO (US)

( * ) Notice: Subject to any disclaimer, the term of this patent is extended or adjusted under 35 U.S.C. 154(b) by 251 days.

(21) Appl. No.: 13/593,720

(22) Filed: Aug. 24, 2012

(65) Prior Publication Data

US 2013/0219768 A1 Aug. 29, 2013

Related U.S. Application Data

(60) Provisional application No. 61/602,333, filed on Feb. 23, 2012.

(51) Int. Cl.
*A47G 5/00* (2006.01)
*A01M 31/00* (2006.01)
*A01M 31/02* (2006.01)

(52) U.S. Cl.
CPC ............. *A01M 31/00* (2013.01); *A01M 31/025* (2013.01); *Y10S 135/901* (2013.01)

(58) Field of Classification Search
CPC ...... E06B 9/24; E04H 15/001; A01M 31/025; A01M 31/00; E04B 2/74; E04B 2/7425
USPC .............. 160/135, 351, 352, 229.1, 230, 232; 114/295, 351, 353; 135/116, 900, 901; 211/64; 24/300, 301, 715.3, 715.4, 24/715.7; 248/220.31, 220.41, 220.42, 248/220.43, 27.8; 43/1; 89/36.01, 36.02
See application file for complete search history.

(56) References Cited

U.S. PATENT DOCUMENTS

| | | | | |
|---|---|---|---|---|
| 2,577,983 | A | * | 12/1951 | Van Vessem .................. 114/351 |
| 2,950,011 | A | * | 8/1960 | Hemphill .......................... 211/1 |
| 3,193,852 | A | * | 7/1965 | Murrmann ..................... 114/351 |
| 3,936,969 | A | * | 2/1976 | Richard .............................. 43/1 |
| 4,070,722 | A | | 1/1978 | Sutherland |
| 4,405,110 | A | * | 9/1983 | Gibbons .................. 248/220.22 |
| 4,798,019 | A | * | 1/1989 | Sury et al. .......................... 43/1 |
| 5,062,234 | A | * | 11/1991 | Green ................................. 43/1 |
| 6,145,528 | A | * | 11/2000 | Egnew et al. ................. 135/128 |
| 6,408,865 | B1 | | 6/2002 | Bliss |
| D532,075 | S | | 11/2006 | Turner |
| 7,234,275 | B1 | * | 6/2007 | Haggy et al. ...................... 52/71 |
| 7,237,283 | B2 | | 7/2007 | Devries |
| 7,401,566 | B1 | | 7/2008 | Miknich |
| 7,549,434 | B2 | | 6/2009 | Bean |
| 7,743,781 | B2 | | 6/2010 | Slaughter |
| 7,828,003 | B2 | | 11/2010 | Montecucco |
| 8,292,683 | B2 | * | 10/2012 | Axtell ........................... 441/132 |

(Continued)

*Primary Examiner* — Katherine Mitchell
*Assistant Examiner* — Jeremy Ramsey
(74) *Attorney, Agent, or Firm* — Law Office of Mark Brown, LLC; Mark E. Brown; Christopher M. DeBacker (57) ABSTRACT

A highly portable, modular hunting blind which adapts to different hunting areas by utilizing local grass and other vegetation for 3-D camouflage and cover purposes. The blind is ideally of a light weight material, such as plastic, and includes adjustable angles for natural cover, and a number of vegetation straps that adjust to any natural cover the hunter chooses to use, such as grass, corn, brush, or tree limbs. This allows hunters to place natural cover at angles that create a secure 3-D effect and allows hunters and game to see through this natural environment eliminating the undesirable "blob" affect caused by dark fabric material, while breaking the hunter's profile.

18 Claims, 13 Drawing Sheets

(56) References Cited

U.S. PATENT DOCUMENTS 8,579,007 B2 * 11/2013 Pottmeyer et al. ......... 160/229.1
2001/0029880 A1 * 10/2001 McCarthy .................... 114/353
2008/0144203 A1 * 6/2008 Williams ...................... 359/866
2010/0229906 A1 9/2010 Putman

* cited by examiner

ADAPTIVE PORTABLE HUNTING BLIND SYSTEM AND METHOD

CROSS-REFERENCE TO RELATED APPLICATIONS

This application claims priority in and incorporates by reference U.S. provisional patent application Ser. No. 61/602,333, filed Feb. 23, 2012.

BACKGROUND OF THE INVENTION

1. Field of the Invention

The present invention relates generally to a system and method for providing an adaptive hunting blind capable of being used in multiple locations, and more specifically to a hunting blind that is highly portable and is concealed using grasses, plants, and other vegetation local to a chosen hunting location.

2. Description of the Related Art

Temporary hunting structures aimed at providing camouflage and cover, commonly referred to as hunting blinds, are popular amongst hunters. Existing blinds include blinds that are similar to a camping tent, blinds which can float on the water, and other popular models such as "coffin blinds."

Existing blinds are constructed using a fabric or canvas type materials for covering and camouflage. There are major problems with using such materials. Fabric adds weight to the line and can create irregular patterns which animals can detect. Similarly, fabric can cause a darkened effect that creates a "blob" site and causes a silhouette effect rather than a natural 3-D effect like grasses and natural environmental camouflage. Fabric is wholly "unnatural," and while existing blinds go to great lengths to use fabric to create a "natural" appearance, fabric is limited.

Most fabric blinds have vegetation straps to help control the camouflage, but these straps can cause an unnatural and cumbersome look due to the size and weight of the vegetation. Further, this setup tends to eliminate the desired 3-D effect of the camouflage, forcing hunters to constantly rebuild the blind throughout the day as the sun shifts and winds move pieces of the blind around.

Existing blinds, such as coffin blinds or pop-up blinds, are built with flaps that are pushed open, sprung open or are dropped in when an animal is near and the hunter decides it is time to fire his weapon. The sudden movement of the flap or lid will often cause birds to "flare," making them much more difficult targets. Any excessive moving parts or unnatural elements decrease the effectiveness of a hunting blind. The flaps and lids can also interfere with a hunter's ability to quickly target and fire upon birds or other animals.

Existing permanent and semi-permanent blinds are often great during the first days of hunting use. However, that cover tends to be knocked down and pressed into the ground by snow and other environmental changes, leading to an unnatural look. Further, permanent and semi-permanent blinds do not allow a hunter to reposition throughout a hunting trip, and some hunting areas forbid the use of permanent or semi-permanent blinds.

What is desired is a highly-portable hunting blind which is capable of adapting to the natural camouflage of a hunting environment without unnecessary and unnatural moving parts, such as flaps or lids, hindering the hunter's ability to target and fire upon prey. Heretofore there has not been available a hunting blind system with the advantages and features of the present invention.

BRIEF SUMMARY OF THE INVENTION

The present invention relates to a highly-portable hunting blind which adapts to different hunting areas by utilizing local grass and other vegetation for 3-D camouflage and cover purposes. The blind is ideally of a light weight material, such as plastic, and includes adjustable angles for natural cover, and a number of vegetation straps (typically comprising bungee or elastic cords) that adjust to any natural cover (such as grass, corn, brush, or tree limbs) the hunter chooses to use. This allows hunters to place natural cover at angles that create a secure 3-D effect and allows hunters and game to see through this natural environment eliminating the undesirable "blob" affect caused by dark fabric material, while breaking the hunter's profile.

The present invention is primarily comprised of at least two bases which each contain a number of stretchable vegetation strips. The bases may be joined at a hinged point or along a third member, and can be folded together or otherwise stacked and stored for quick storage and transport. A number of anchors or stakes are stored within the bases of the blind which allow the blind to be temporarily affixed to the earth.

An aspect of the present invention utilizes a blind material which allows the portable blind to float atop water for use when hunting water fowl or other animals in or near the water. The anchors or stakes stored within the blind can be removed or repositioned such that the buoyant blind becomes anchored to the bottom of the body of water in which it is placed.

The present invention can be used in conjunction with existing hunting blinds to create larger, more natural blinds with greater 3-D concealment for maximum seclusion. The invention may also be used on boats or water-faring craft to allow hunters additional range when hunting on or near the water.

An aspect of the present invention includes a hinge joining two separate bases of the blind. This allows for quick storage and ensures that the blind can be reconfigured at multiple angles for optimum seclusion and coverage.

The present invention is a multi-use blind suitable for waterfowl hunting, field hunting, archery hunting, primitive hunting, deer hunting, turkey hunting, predator hunting, and/or positive concealment by law enforcement, bird watching, boats, military, filming wild life, etc. and in general, the pursuit of all game and non-game animals.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment or Aspect Portable Hunting Blind System 2

Figure 1:
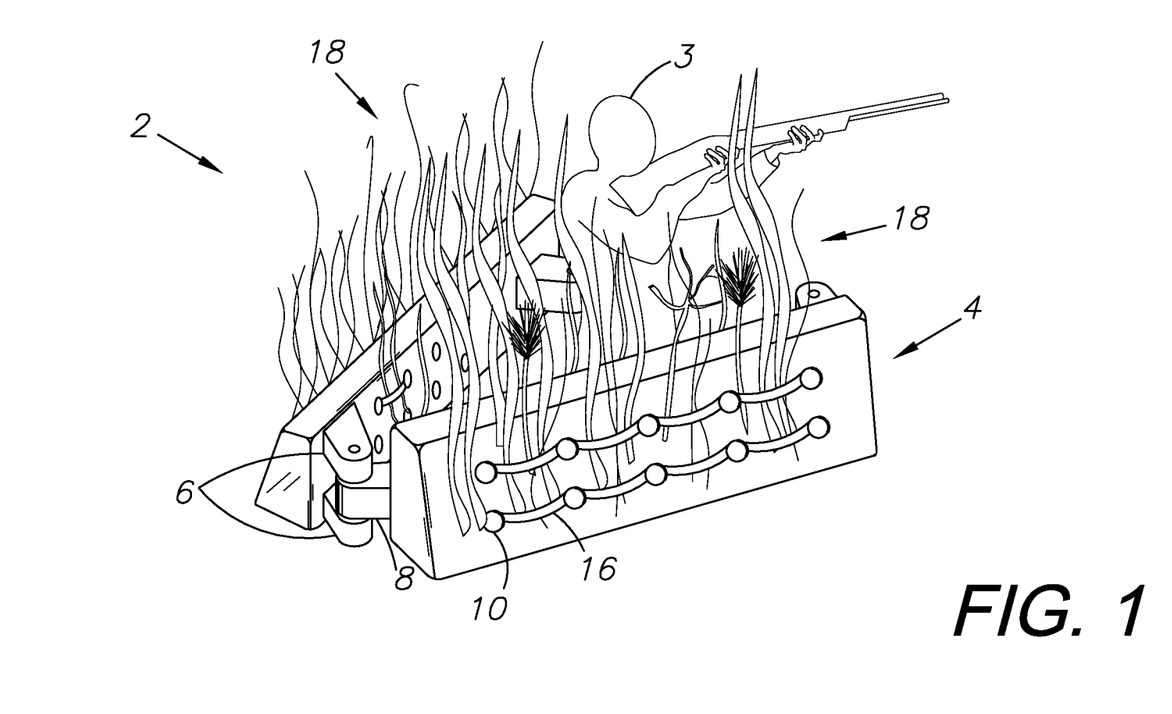
FIG. 1 is an isometric view of an embodiment of the present invention in a typical environment.

A preferred embodiment of the hunting blind system 2 will be set up in an area where the user intends to hunt game, such as water fowl, deer, or other popular fauna. As shown in FIG. 1, a hunter 3 will set up behind the blind system 2 after placing camouflage 18, such as various local foliage, against the blind bases 4 or through the straps 16 inserted through the various holes 10 within the bases 4. The camouflage 18 is placed against both the front face 20 and the rear face 22 of the base 4 to produce a three-dimensional camouflage effect that produces a superior camouflage technique when hunting.

Figure 2A:
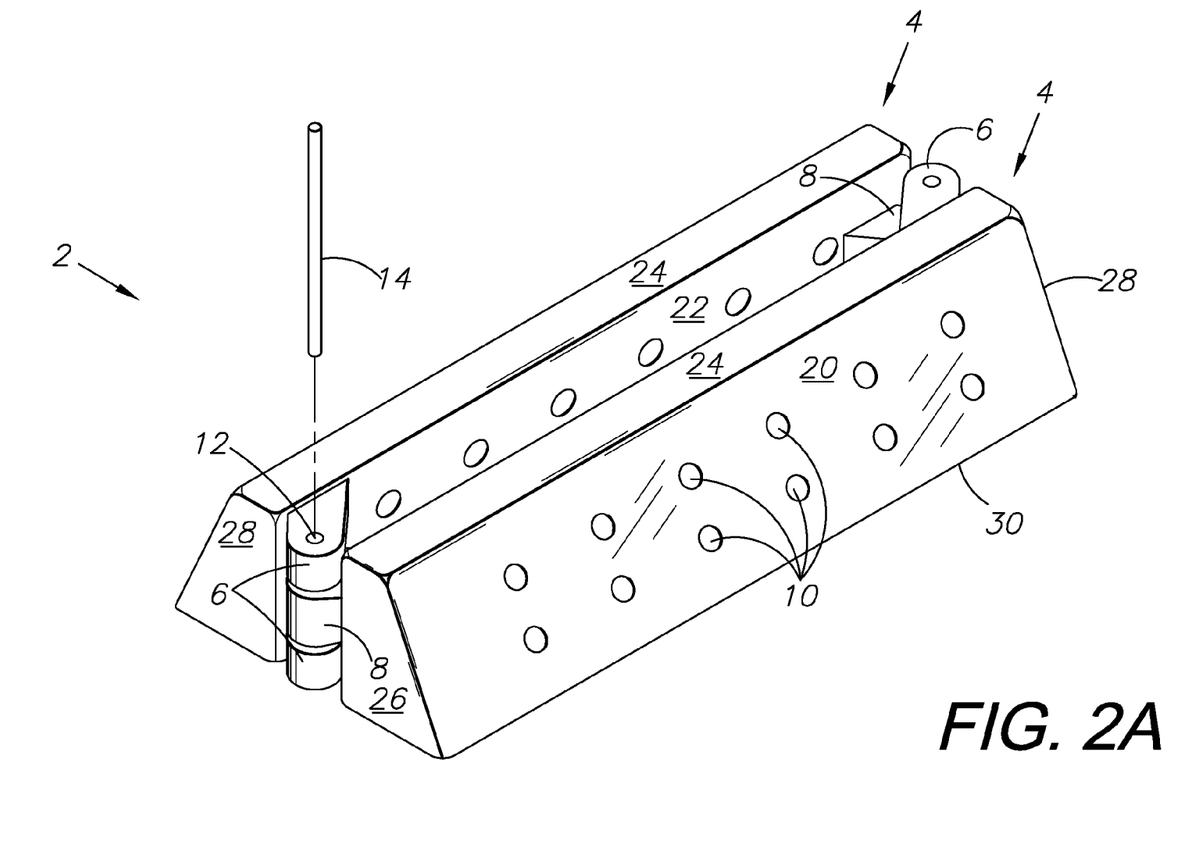
FIG. 2A is an isometric view of an embodiment of the present invention in a closed position.
Figure 2B:
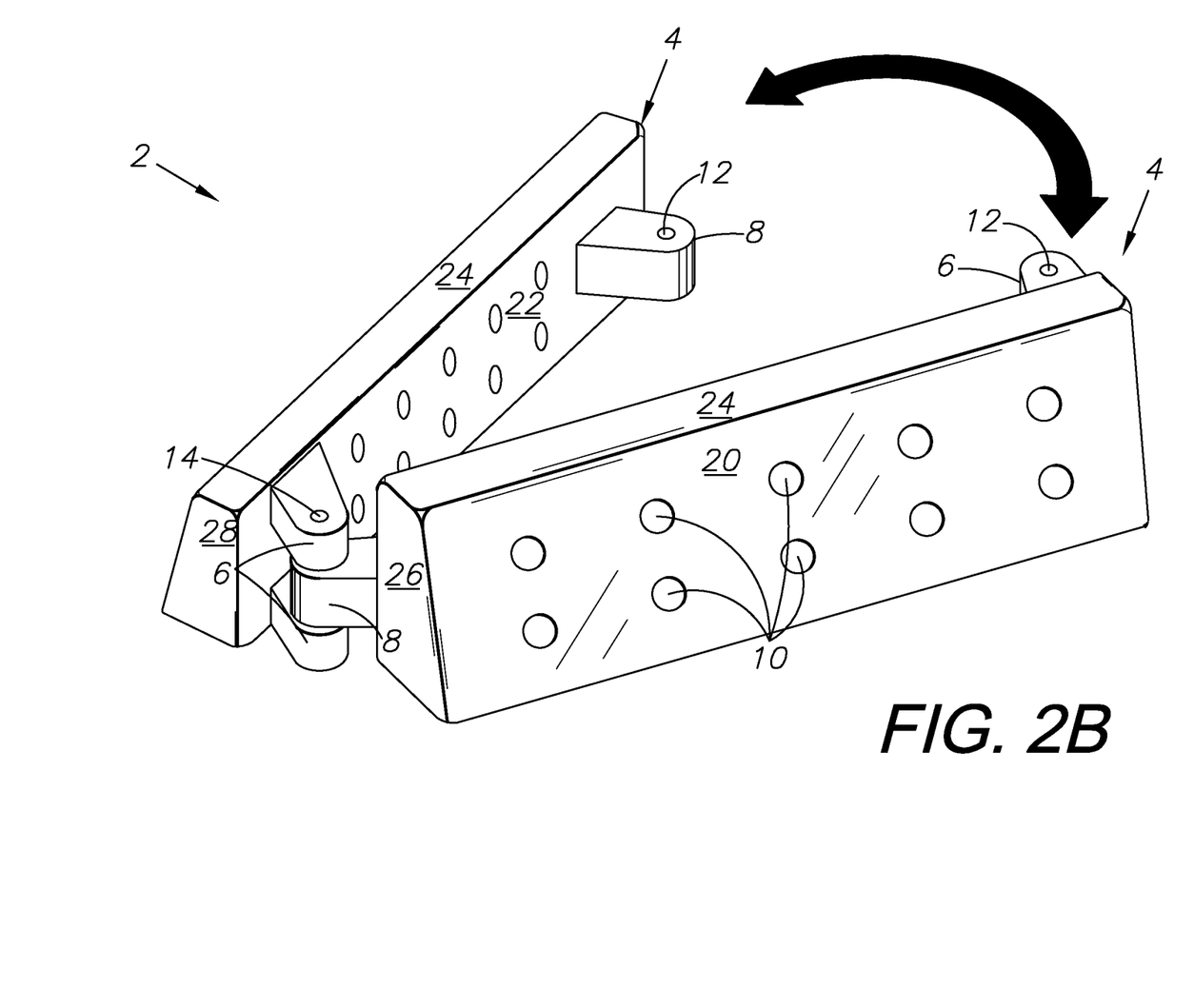
FIG. 2B is an isometric view of an embodiment of the present invention in an open position.

As shown in FIGS. 2A and 2B, the hunting blind 2 is primarily comprised a pair of modular bases 4. In a preferred embodiment, these bases 4 are hinged about a single hinge post 14, allowing the bases 4 to be folded to a number of angles, or folded together for transport and/or storage. FIG. 2A displays the hunting blind system 2 in a compact storage configuration, whereas FIG. 2B displays the hunting blind system 2 where the pair of bases 4 are opened to a desired angle.

Figure 3:
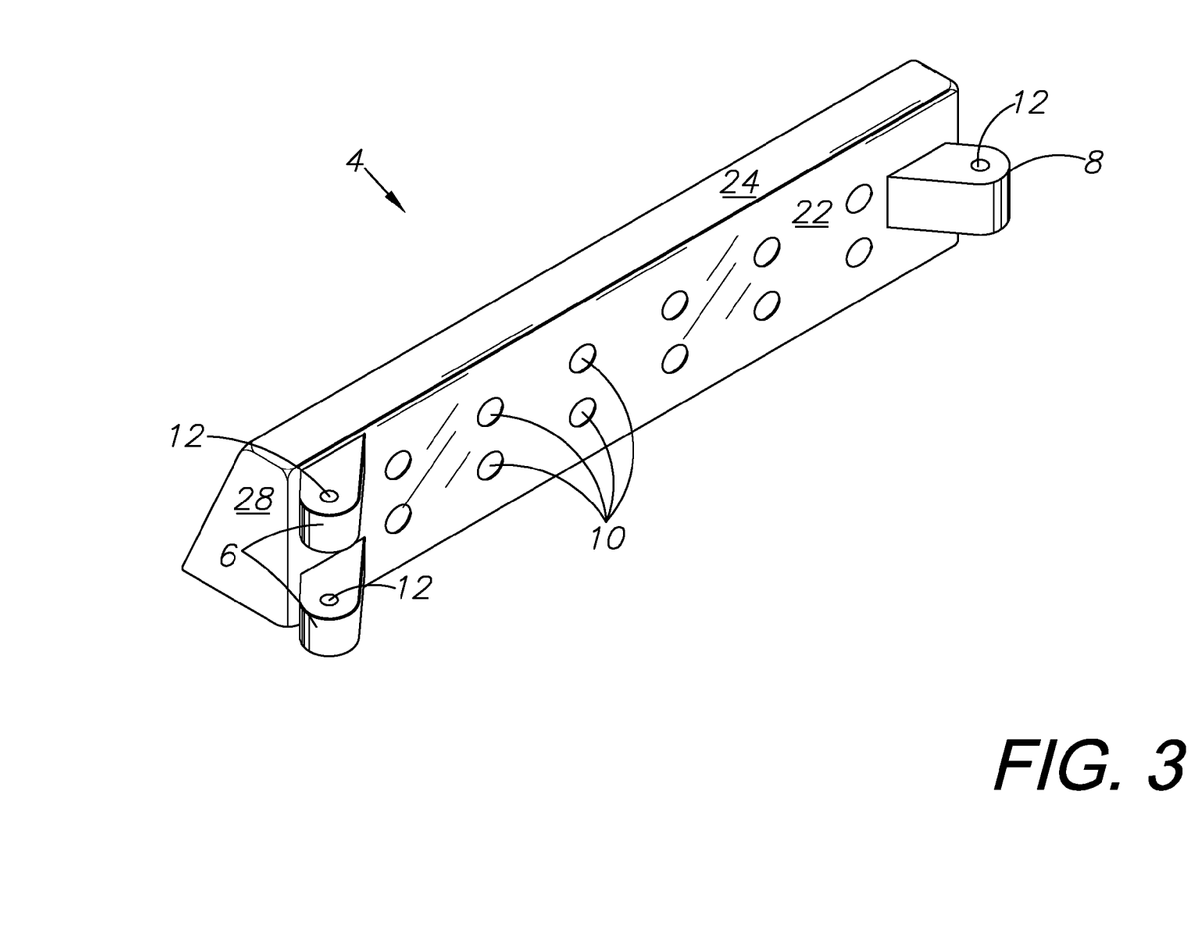
FIG. 3 is an isometric view of a modular element of an embodiment of the present invention from a rear-side view.

FIG. 3 displays a stand-alone modular base 4 made up of a front face 20, a rear face 22, a top face 24, a first end 26, a second end 28, and a bottom face 30. The base 4 includes a pair of boundary hinges 6 on one end and a center-hinge 8 on the other. Each hinge has a hinge post insert 12 passing through the center.

Figure 4:
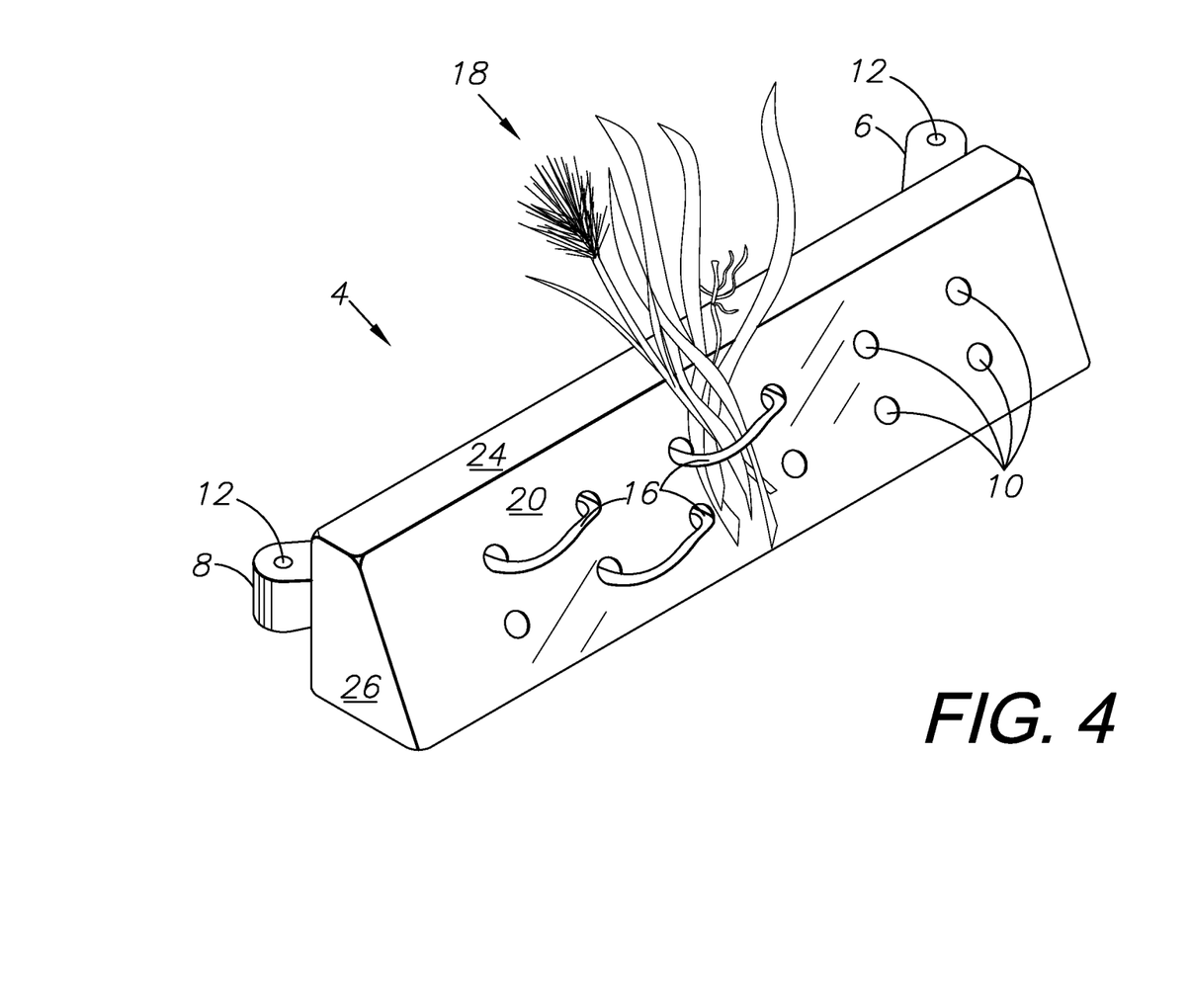
FIG. 4 is an isometric view of a modular element of an embodiment of the present invention interacting with the typical environment from a front-side view.
Figure 5:
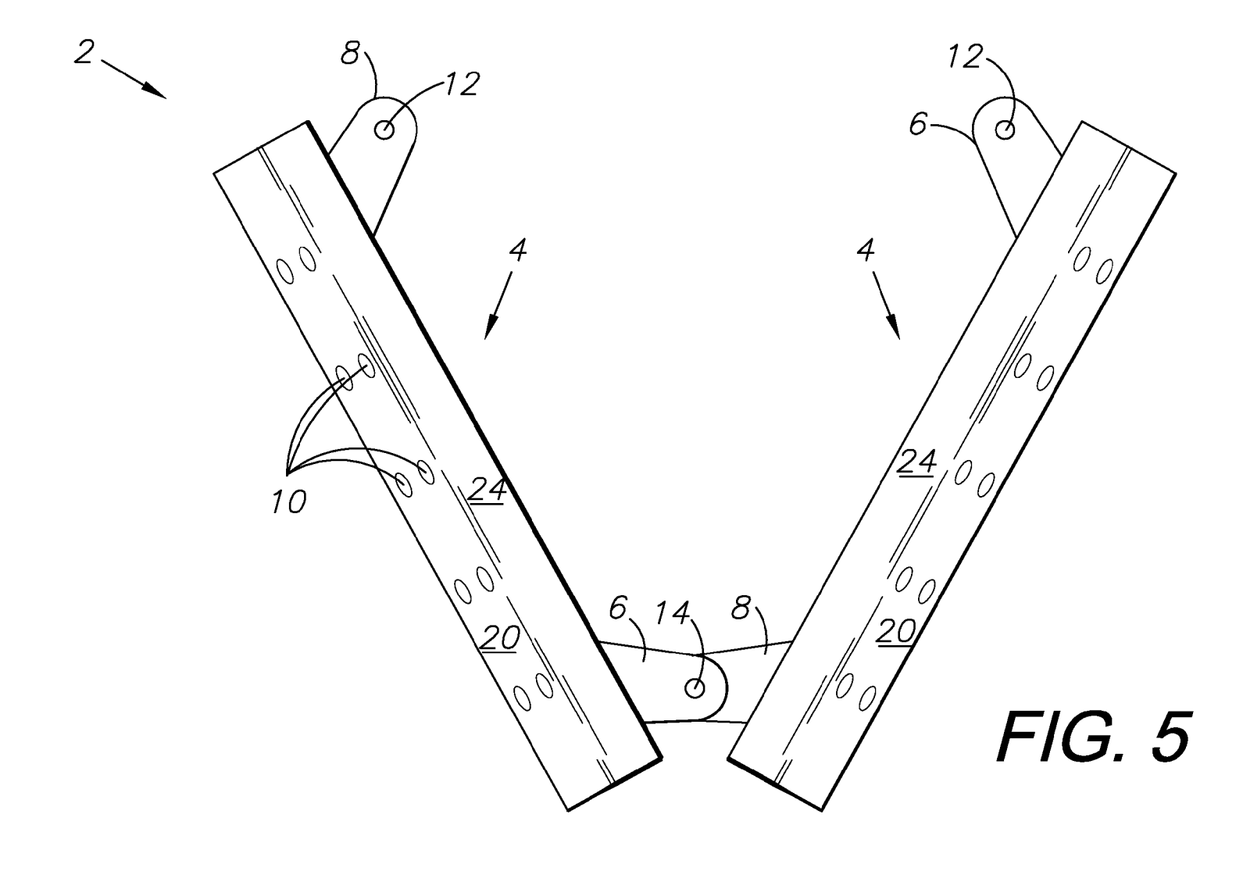
FIG. 5 is a top plan view of an embodiment of the present invention.

As shown in FIG. 4, each base 4 contains a number of cut-aways or holes 10 to allow the vegetation strap(s) 16 to be laced through the bases 4. These straps are preferably of elastic or a similar material, and allow the bases 4 to be covered in camouflage 18 such as grass, twigs, branches, brush, or other vegetation. Ideally this vegetation 18 will be from the same or similar area where the user intends to hunt. The holes 10 should be placed in the modular base 4 near each of the ends 26, 28 and throughout the front 20 and rear 22 surfaces of the base 4, such that complete camouflage coverage is possible and the hinged portion of the blind 2 does not remain uncovered and unnatural-looking.

Figure 6:
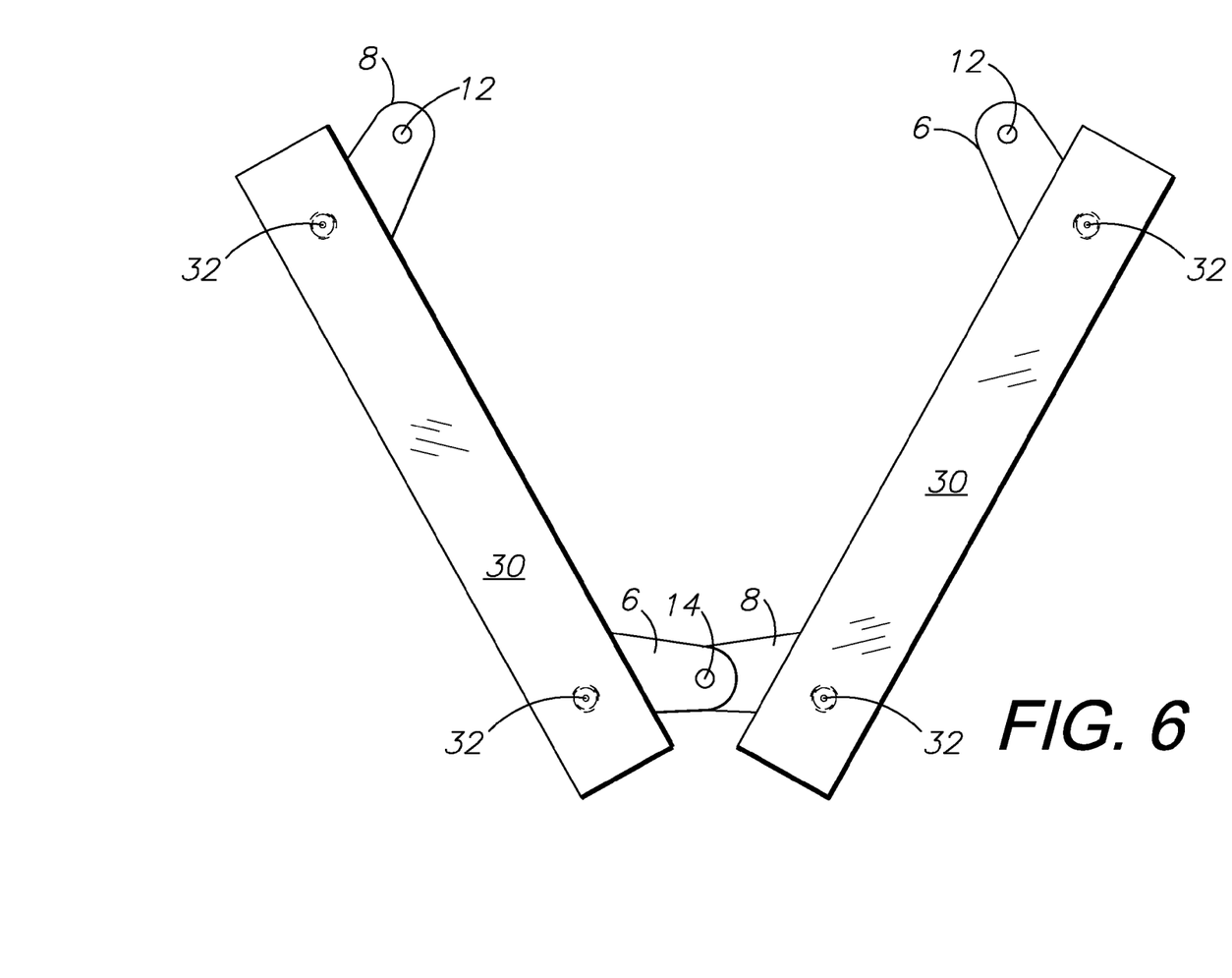
FIG. 6 is a bottom plan view of an embodiment of the present invention.
Figure 7:
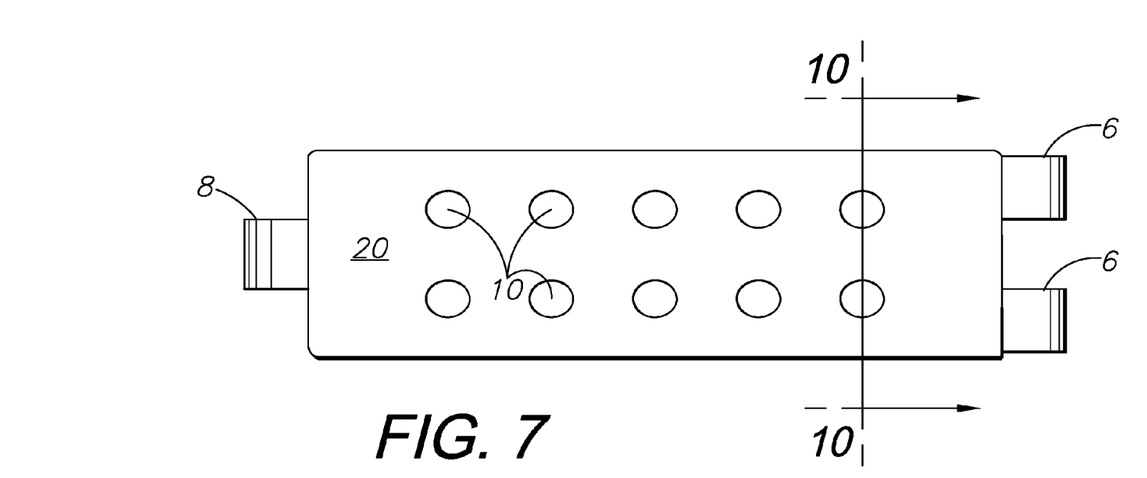
FIG. 7 is a front elevation of an embodiment of the present invention.
Figure 8:
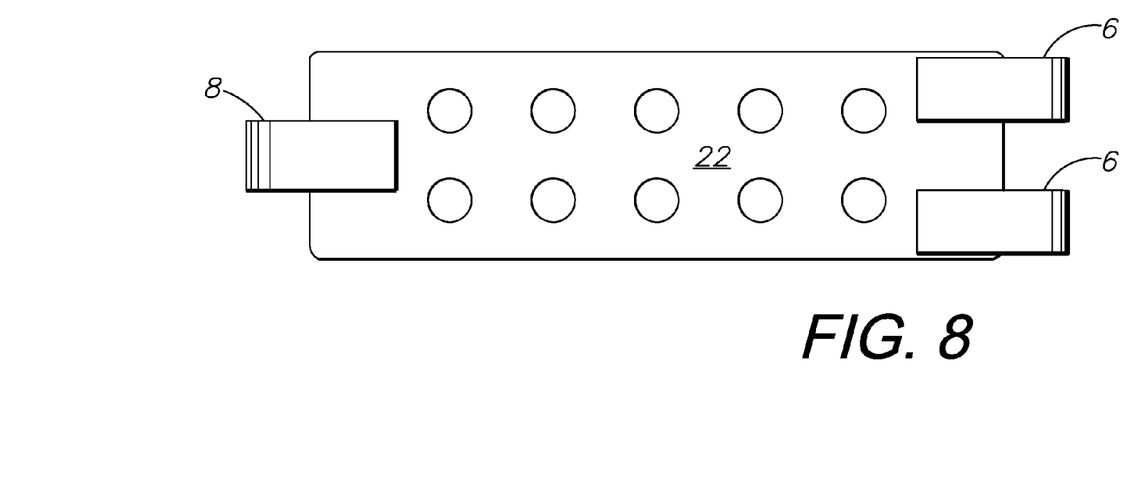
FIG. 8 is a rear elevation of an embodiment of the present invention.
Figure 9:
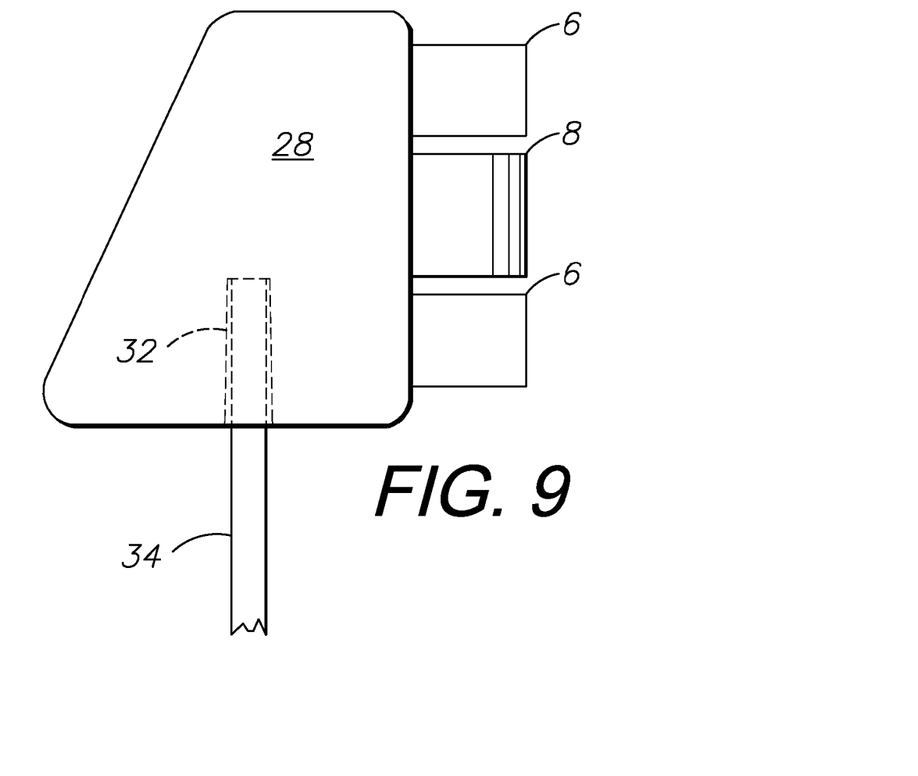
FIG. 9 is a side elevation of an embodiment of the present invention.

As shown in FIG. 6 and more clearly in FIG. 9, each base 4 has a pair of stake inserts 32 for receiving a stake 34. These stakes 34 should be sufficiently long enough to allow the blind 2 to be placed in a shallow body of water. The bases should remain on the surface of the water while the anchor stakes penetrate the soil beneath the water. The stakes 34 may also be used on dry land to prevent the blind from moving due to wind or contact from the hunter.

In an optional embodiment, a relief (not shown) may be carved into the bottom face 30 or any side face of the bases 4 to store the stakes when not in use. A third stake 34 may be stored in a third recessed area in either one of the bases. When the bases are bent away from one another to form an angle, the stakes may be removed from the recesses and should provide an anchor point at each of the three corners of the triangle formed by the bases, as shown in FIG. 2B.

Another optional feature includes a shoulder strap (not shown). A strap may be affixed, temporarily or permanently, to each modular base 4, and would be used to ease carrying.

The modular bases 4 should be made of a light-weight, semi-buoyant material, allowing the blind to function in shallow water. The material may be selectively flexible to allow additional shapes to be formed from the blind. The ultimate purpose of the blind is to create a natural-looking shape using camouflage 18 and natural angles such that an animal will not be spooked by the blind.

Figure 10:
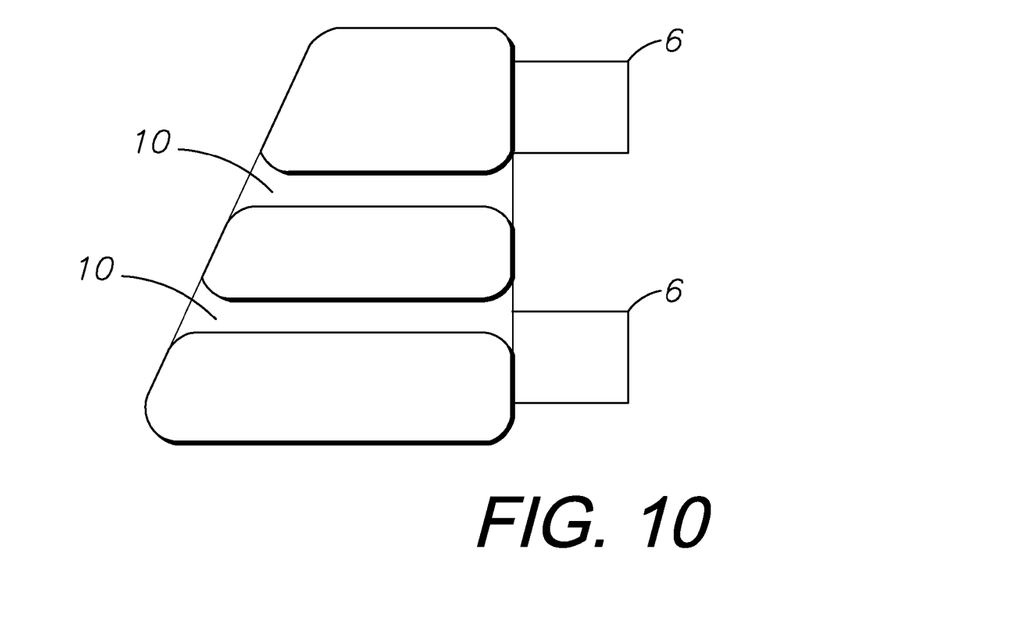
FIG. 10 is a sectional view of an embodiment of the present invention as taken about the line in FIG. 7.

FIGS. 5-10 provide additional detail about a preferred embodiment blind system 2. As shown in FIG. 10, the "inserts" 10, or holes, are slightly tapered to ensure the vegetation straps 16 do not slip during use.

III. Alternative Embodiment Hunting Blind System 52

Figure 11:
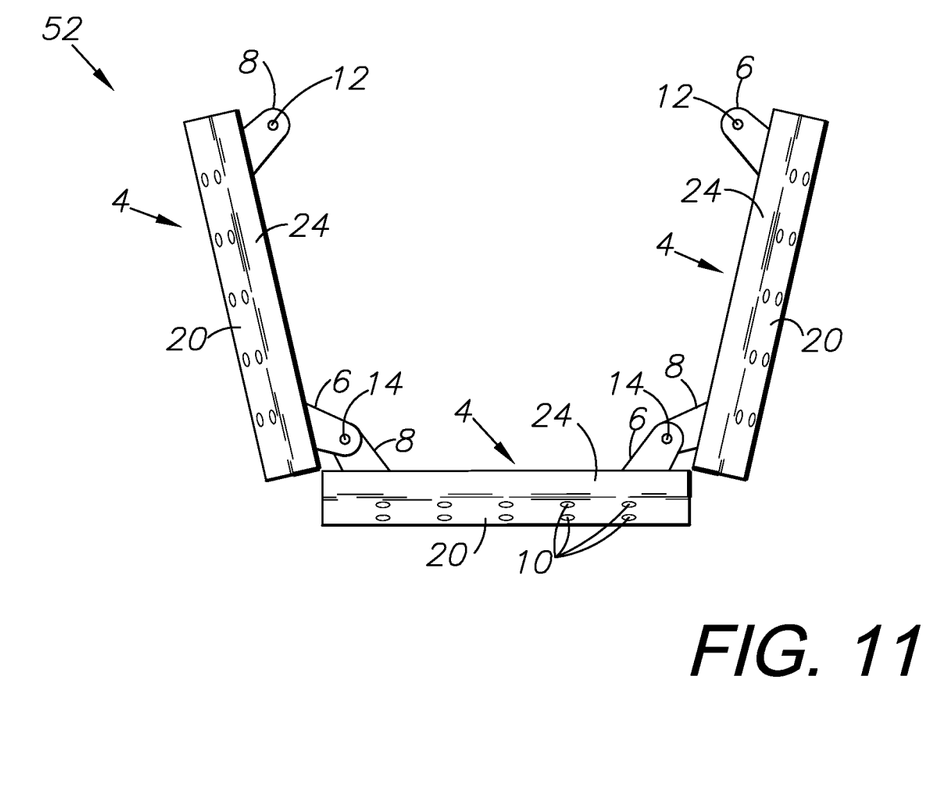
FIG. 11 is a top plan view of an alternative embodiment of the present invention, utilizing three modular elements.

FIG. 11 shows an alternative embodiment hunting blind system 52. In this figure, three modular bases 4 are linked by a pair of hinge posts 14. This allows a hunter to set up a larger hunting station and maintain natural angles and vegetation. Any number of modular bases 4 can be linked together in this way to form a hunting station of any desired size and shape.

IV. Alternative Embodiment Hunting Blind System 102

Figure 12:
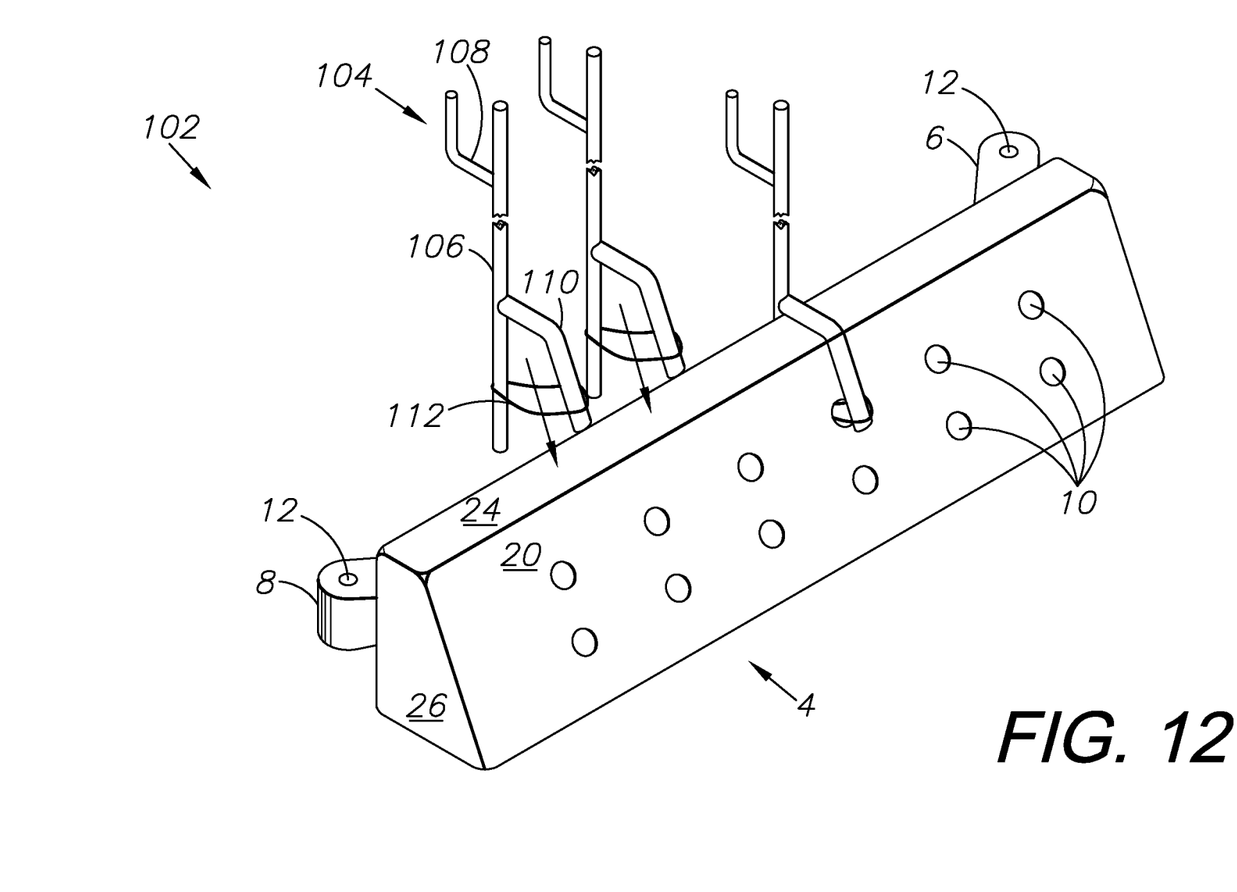
FIG. 12 is an isometric view of another alternative embodiment of the present invention, including forked hook elements for interacting with the preferred environment.

FIG. 12 shows an alternative embodiment hunting blind system 102. This system is identical to the preferred embodiment above, except that it also utilizes camouflage hooks 104 which can hold natural vegetation to further obscure the hunting blind system 102 and the hunter 3 behind it. The hooks 104 include a hook shaft 106, an upper forked leg 108, and a lower forked leg 110. The upper forked leg 108 may include multiple prongs, and is designed to hold long grasses, twigs, and other vegetation. The lower forked leg 110 is shaped to fit over the modular base 4. Ideally, the hook 104 would fit over the base 4 and rest next to an insert 10. A tie 112 can be threaded through the insert 10 and used to secure the hook 104 in place.

Alternatively, the hooks 104 can be used to store the hunter's gear while the blind 102 is in use. If the blind is positioned in water as described above, it is necessary to ensure that the hunter's gear stays dry. This includes bags, ammunition, rifles, bows, animal calls, and other hunting accessories. This feature would also be useful when the blind is not placed in water, as it would allow the hunter to organize gear and keep it out of the way and off of the ground.

V. Alternative Embodiment Hunting Blind System 152

Figure 13:
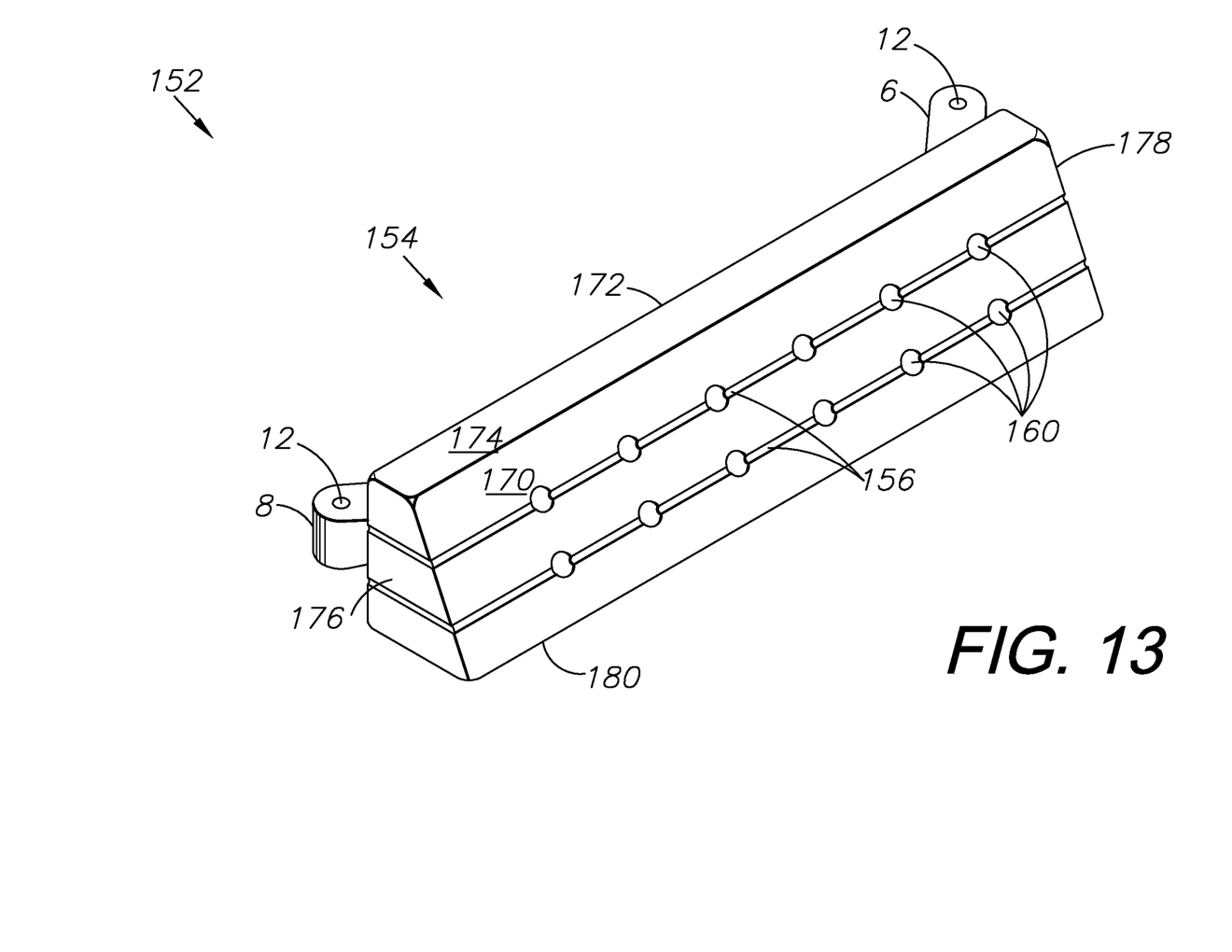
FIG. 13 is an isometric view of another alternative embodiment, including indentions in the front, side, and rear faces of a modular element for receiving large bungee cords or tie-down elements.
Figure 14:
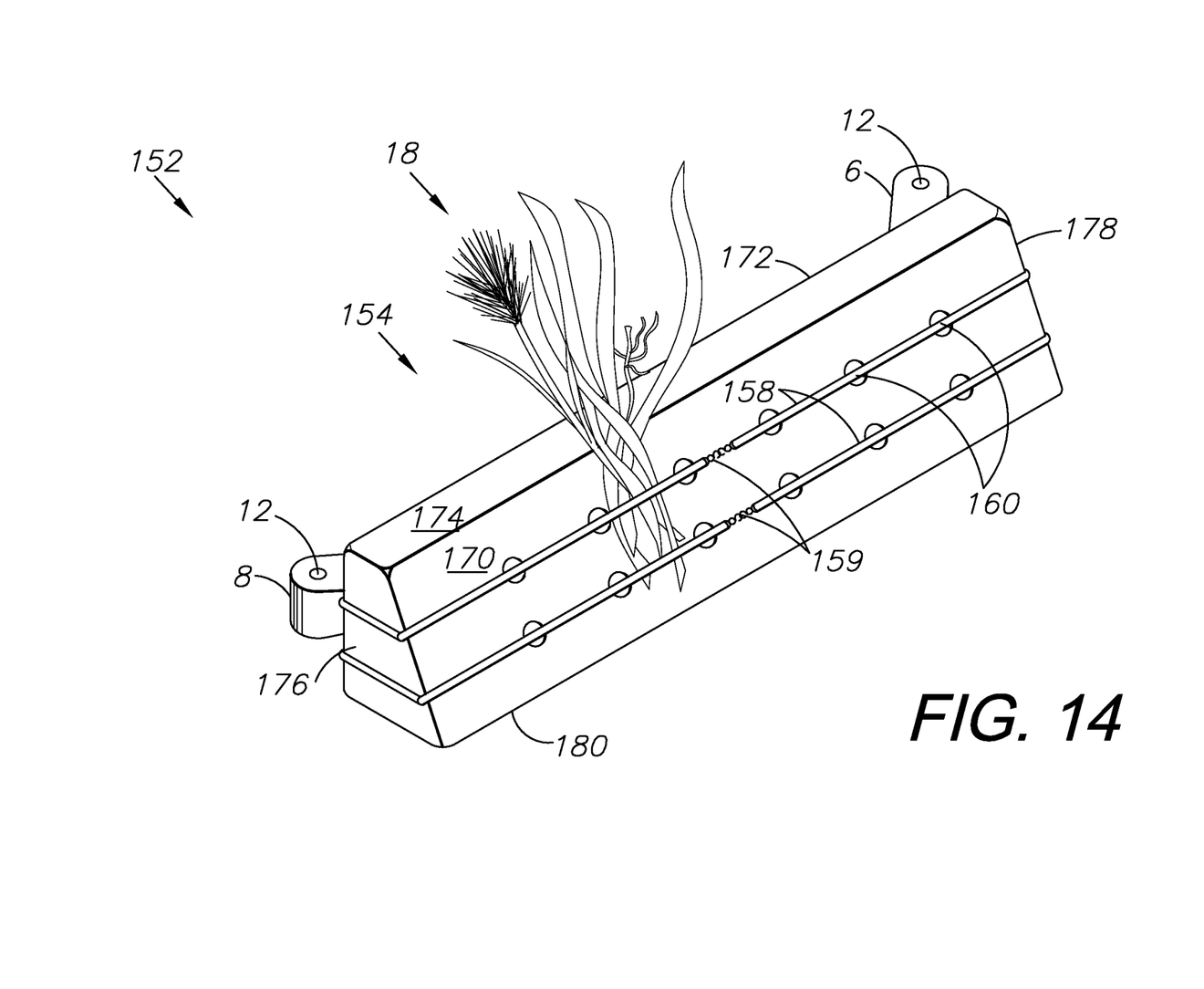
FIG. 14 is an isometric view of the embodiment of FIG. 13 including a bungee cord tie-down element.

FIGS. 13 and 14 show yet another alternative embodiment hunting blind system 152. In this embodiment, the modular bases 154 include a pair of grooves 156 on the front face 170, rear face 172, first side 176, and second side 178. In the preferred embodiment there would be one groove 156 running in parallel with the lines of inserts 160 along the front 170 and rear 172 faces. The top face 174 and bottom face 180 do not have grooves. The grooves allow a long bungee cord 158 to slip over the entire modular base 154, or the bungee cords may be fastened using S-hooks 159 or a similar quick attachment. This bungee cord can be used to hold vegetation 18 for camouflage purposes. Alternatively, synthetic vegetation, cloth strips, or other typical hunting camouflage elements may be used for camouflage.

Similar to the embodiment previously mentioned, the bungee cord is capable of holding camouflage elements against both the front face 170 and the rear face 172 of the base 154. This produces a three-dimensional camouflage effect that provides a superior hunting advantage.

It is to be understood that the invention can be embodied in various forms, and is not to be limited to the examples discussed above. The range of components and configurations which can be utilized in the practice of the present invention is virtually unlimited.

The invention claimed is:

1. A camouflaged hunting blind system comprising:
   a base assembly including multiple bases, each said base comprising an elongated body including a front face, a rear face, a top face, a bottom face, a first end, and a second end;
   each said base including a plurality of holes penetrating horizontally through said base, beginning at said front face and ending at said rear face;
   a camouflage element;
   a camouflage element retaining strap extending through a respective hole and adapted to capture and retain said camouflage element against at least one face of said base;
   each said base including a first hinge protrusion affixed to and protruding from said rear face proximal to the first end and a second hinge protrusion affixed to and protruding from said rear face proximal to the second end;
   each said first hinge protrusion being configured for pivotally interlocking with a respective second hinge protrusion on any adjacent base whereby respective interlocked bases are configured for rotating around vertical rotational axes relative to each other;
   said rear faces of any adjacent base are configured to fold substantially parallel to one another; and
   said bases being configured for interlocking to each other in multiple-base configurations comprising two or more bases and thereby forming multi-sided hunting blinds with variable configurations.

2. The system of claim 1, further comprising:
   a plurality of camouflage elements comprising natural vegetation; and
   wherein said strap is adapted to hold said camouflage elements against said base.

3. The system of claim 2, further comprising:
   a first hinge protrusion affixed to said first end;
   a second hinge protrusion affixed to said second end; and
   each said hinge protrusion including an opening extending vertically through said protrusion.

4. The system of claim 3, further comprising:
   a base assembly comprising said first base and a second base;
   wherein said first base's first hinge protrusion is interlocked with said second base's second hinge protrusion; and
   a hinge rod adapted to be inserted through the openings of said interlocked first and second hinge protrusions.

5. The system of claim 4, wherein said first and second bases form an angle between 20 degrees and 175 degrees about said hinge rod.

6. The system of claim 1, further comprising:
   a first stake and a second stake, each stake including a blunted proximal end and a sharpened distal end;
   a first insert located in said base bottom face, said first insert located near said base first end;
   a second insert located in said base bottom face, said second insert located near said base second end;
   wherein said sharpened distal ends of said stakes are inserted into the earth; and
   wherein said blunted proximal ends of said first and second stakes are inserted into respective said first and second inserts.

7. The system of claim 1, further comprising:
   a utility hook including a vertical rod having a top end and a bottom end, an upper forked leg affixed to said vertical rod in proximity to said top end, and a bottom forked leg affixed to said vertical rod in proximity to said bottom end;
   said upper forked leg adapted to store hunting equipment; and
   said lower forked leg adapted to secure said utility hook to said base.

8. The system of claim 1, further comprising:
   a groove etched into said base front face, rear face, first end, and second end;
   a cord adapted to fit over said base elongated body, such that the cord is seated in said groove;
   a plurality of camouflage elements comprising natural vegetation; and
   wherein said cord is adapted to hold said camouflage elements against said modular base.

9. The system of claim 1, further comprising a shoulder strap affixed to said base and adapted to fit a human shoulder.

10. The system of claim 1, wherein said base is constructed of buoyant plastic.

11. A hunting blind system comprising:
    a base assembly comprising a first modular base and a second modular base, each said base being comprised of a buoyant plastic body;
    each said modular base comprising an elongated body including a front face, a rear face, a top face, a bottom face, a first end, and a second end;
    each said base including a first hinge protrusion affixed to and protruding from said rear face proximal to the first end and a second hinge protrusion affixed to and protruding from said rear face proximal to the second end;
    each said first hinge protrusion being configured for pivotally interlocking with a respective second hinge protrusion on any adjacent base whereby respective interlocked bases are configured for rotating around vertical rotational axes relative to each other;

each said hinge protrusion including an opening extending vertically through said protrusion;
wherein said first modular base's first hinge protrusion is interlocked with said second modular base's second hinge protrusion;
a hinge rod adapted to be inserted through the openings of said interlocked hinge protrusions;
wherein said first and second modular bases form an angle between 20 degrees and 175 degrees about said hinge rod;
a plurality of holes penetrating horizontally through said modular base, beginning at said front face and ending at said rear face;
a strap;
a plurality of camouflage elements comprising natural vegetation;
wherein a strap is adapted to hold said camouflage elements against said modular base;
said rear faces of any adjacent base are configured to fold substantially parallel to one another; and
said bases being configured for interlocking to each other in multiple-base configurations comprising two or more bases and thereby forming multi-sided hunting blinds with variable configurations.

12. The system of claim 11, further comprising:
two pairs of stakes, each said stake including a blunted proximal end and a sharpened distal end;
a first stake insert located in each said modular base bottom face, said first stake insert located near said modular base first end;
a second stake insert located in each said modular base bottom face, said second stake insert located near said modular base second end;
wherein said sharpened distal ends of said stakes are inserted into the earth; and
wherein said blunted proximal ends of said stakes are inserted into said first and second stake inserts.

13. The system of claim 12, further comprising:
a utility hook including a vertical rod having a top end and a bottom end, an upper forked leg affixed to said vertical rod in proximity to said top end, and a bottom forked leg affixed to said vertical rod in proximity to said bottom end;
said upper forked leg adapted to store hunting equipment; and
said lower forked leg adapted to secure said utility hook to one of said modular bases.

14. The system of claim 12, further comprising:
a groove etched into each said modular base front face, rear face, first end, and second end;
a cord adapted to fit over one said modular base elongated body, such that the cord is seated in said groove;
a plurality of camouflage elements comprising natural vegetation; and
wherein said cord is adapted to hold said camouflage elements against said modular base.

15. The system of claim 12, further comprising a shoulder strap affixed to each said modular base and adapted to fit a human shoulder.

16. A method of setting up a camouflaged hunting blind, which method comprises the steps of:
providing first and second bases, each said base comprising an elongated body including a front face, a rear face, a top face, a bottom face, a first end, and a second end, wherein a plurality of holes penetrate horizontally through each said base, beginning at said front face and ending at said rear face;
providing each said base with a first hing protrusion affixed to and protruding from said rear face proximal to the first end and a second hinge protrusion affixed to and protruding from said rear face proximal to the second end;
pivotally interlocking said hinge protrusions whereby said bases are configured for rotating around vertical rotational axes relative to one another;
placing said first base first end in proximity to said second base second end;
folding said bases with said rear faces thereof substantially parallel to one another;
providing a plurality of camouflage elements comprising natural vegetation;
placing said plurality of camouflage elements against at least one face of said first and second bases; and
securing said plurality of camouflage elements against said bases by looping a strap through said plurality of holes.

17. The method according to claim 16, further comprising the steps:
providing a vertical opening through said first and second hinge protrusions;
providing a vertical hinge rod; and
inserting said vertical hinge rod through said first and second hinge protrusion openings.

18. The method according to claim 17, further comprising the step:
forming an angle between 20 degrees and 175 degrees about said hinge rod between said first and second bases.

* * * * *